United States Patent
Guidry

(10) Patent No.: US 12,330,876 B1
(45) Date of Patent: Jun. 17, 2025

(54) ENHANCED TORQUE AND TRANSPORTATION PROCESS FOR OILWELL TUBULAR GOODS

(71) Applicant: Bobcat Oilfield Solutions & Services, LLC, Houma, LA (US)

(72) Inventor: Kevin Guidry, Houma, LA (US)

(*) Notice: Subject to any disclaimer, the term of this patent is extended or adjusted under 35 U.S.C. 154(b) by 0 days.

(21) Appl. No.: 18/673,900

(22) Filed: May 24, 2024

Related U.S. Application Data

(60) Provisional application No. 63/468,643, filed on May 24, 2023.

(51) Int. Cl.
  *B65G 13/12* (2006.01)
  *B65G 13/06* (2006.01)
  *F16L 15/00* (2006.01)

(52) U.S. Cl.
  CPC ............ *B65G 13/12* (2013.01); *B65G 13/06* (2013.01); *B65G 2201/0276* (2013.01); *F16L 15/00* (2013.01)

(58) Field of Classification Search
  CPC . B65G 2201/0276; B65G 13/12; B65G 13/06
  See application file for complete search history.

(56) References Cited

U.S. PATENT DOCUMENTS

| | | | | |
|---|---|---|---|---|
| 3,706,347 | A * | 12/1972 | Brown | E21B 19/15 414/22.58 |
| 3,797,686 | A * | 3/1974 | Jarvis | B65G 47/31 414/431 |
| 6,817,633 | B2 | 11/2004 | Brill et al. | |
| 8,042,432 | B2 | 10/2011 | Hunter et al. | |
| 8,573,891 | B2 | 11/2013 | Horton, III et al. | |
| 11,118,414 | B2 | 9/2021 | Orr et al. | |
| 11,187,055 | B2 | 11/2021 | Løvoll et al. | |
| 11,549,314 | B2 | 1/2023 | De Lemos Junior et al. | |
| 11,643,887 | B2 | 5/2023 | Petrello et al. | |
| 2021/0078679 | A1 * | 3/2021 | Fenini | F16L 1/19 |
| 2023/0212919 | A1 | 7/2023 | Fanguy | |

FOREIGN PATENT DOCUMENTS

| WO | 2008103069 | | 8/2008 | |
|---|---|---|---|---|
| WO | WO-2022076724 | A1 * | 4/2022 | E21B 19/161 |

OTHER PUBLICATIONS

Weatherford, Onshore Bucking Facility Reduces Run Time by 33%, Saves Operator $83,000, Jul. 18, 2023, https://www.weatherford.com/documents/real-result/tubular-running-services/tubular-management/onshore-bucking-facility-reduces-run-time-by-33-,-saves-operator-$83,000/.

Weatherford, Weatherford Tubular Management Services, 2013, p. 5, https://www.weatherford.com/documents/brochure/products-and-services/tubular-running-services/tubular-management-services/.

Onshore Rigs, Herrenknecht Vertical, https://www.herrenknecht-vertical.com/rigs-and-equipment/onshore-rigs, pp. 1, 3.

Weatherford, Tubular Management, Jul. 17, 2013, https://www.weatherford.com/products-and-services/well-construction-and-completions/tubular-running-services/traditional-systems/tubular-management/.

\* cited by examiner

*Primary Examiner* — Jason L Vaughan
*Assistant Examiner* — Amanda Kreiling
(74) *Attorney, Agent, or Firm* — Emily Gordy

(57) ABSTRACT

The present invention relates to a system and method for torquing tubular goods at an inland facility to form tubular assemblies, conveying the tubular assemblies, and transporting the tubular assemblies to well construction sites.

10 Claims, 22 Drawing Sheets

ENHANCED TORQUE AND TRANSPORTATION PROCESS FOR OILWELL TUBULAR GOODS

BACKGROUND OF THE INVENTION

I. Field of the Invention

The present invention relates generally to a system and method for torquing tubular goods—wherein tubular goods may comprise tubulars and/or accessories—at an inland facility to form a tubular assembly, conveying the tubular assembly to a shipping vessel (or any other transportation means known in the art), and transporting the tubular assembly to a well construction site.

II. General Background

As one background example, oil and gas drilling operations rely on conduits, comprised of tubular assemblies, to transport produced fluids. The tubular assemblies are connected and placed into the drilling well to create a tubing string which provides a route to the surface for production of oil and gas. The current industry standard is to transport tubular goods from a storage facility to either an intermediary location (such as a shore base) or a drilling location where the torquing process to create tubular assemblies is then done. This process requires a great deal of onsite preparation and processing to create the tubular assemblies. A great deal of time, money, and operating space can be saved by shipping tubular assemblies to the well construction locations, thereby removing the need for extensive onsite tubular torquing and processing.

While certain onshore tubular torquing processes have been used to serve well construction locations previously, no such onshore tubular torquing processes have been used in an inland facility. The present invention includes improvements that allow for direct shipping of tubular assemblies from inland facilities to well constructions sites, thereby removing the need to load and unload tubular goods at a midpoint in the delivery journey solely for torquing and processing.

Additionally, the conveyor and racking system elements of the present invention will further improve the delivery process. Individual tubular goods are fed into the conveyor where they are torqued together to form tubular assemblies that are then conveyed to a racking system located near a loading station for marine vessels (or any other transportation means known in the art), thereby increasing efficiency by having all stations of the inventive system tied close together.

We speculate that the inland location and streamlined nature of the improved torque, conveyor, and racking system described below will allow for a more efficient method of processing and delivering tubular assemblies to well construction sites. Moreover, the disclosed invention allows tubular assemblies to be delivered directly to the well construction sites, thereby eliminating the need for an intermediary location for torquing and processing of tubular goods and/or accessories.

SUMMARY OF THE INVENTION

The present invention includes an improved process for joining tubular goods to create a tubular assembly comprising the following steps: (a) positioning a first tubular good onto a section of a three-section conveyor; (b) positioning a second tubular good onto an another section of said three-section conveyor; (c) moving said first and second tubulars together so said first and second tubulars meet within a torque unit located between the two sections of said three-section conveyor; and (d) engaging said torque unit to torque said first tubular to said second tubular to form a tubular assembly; wherein said joining process occurs at an inland facility.

The present invention also includes an improved system for joining tubular goods to create a tubular assembly comprising: a loading rack; a three-part conveyor comprising a first section adjacent to said loading rack and having a proximal and a distal end, a second section located adjacent to said proximal end of said first section, and a third section located adjacent to said distal end of said first section; a torque unit located between said first section and said second section; a spinner located within said second section; and a racking system proximately located to said third section, wherein said improved system is located at an inland facility.

BRIEF DESCRIPTION OF THE DRAWINGS

The foregoing and other objects, features, and advantages of the invention are apparent from the following detailed description taken in conjunction with the accompanying drawings in which like parts are given like reference numerals. The following figures are for purposes of explanation and illustration, and not limitation.

DETAILED DESCRIPTION

Inland Joining of Tubular Goods:

The present invention includes an enhanced process for torquing together tubular goods (wherein tubular goods are comprised of tubulars and/or accessories) to create tubular assemblies for well construction operations. The enhanced process operates from an inland facility, preferably with access to navigable water, wherein "inland" is defined as being at least two miles (and many times further than two miles) away from the coastline.

The inland facility location with access to navigable water is beneficial because it allows for tubular assemblies to be created where the tubular goods are stored, and thereafter such tubular assemblies can be loaded directly onto shipping vessels (or another transportation means) to be transported to locations where intended to be used in well construction.

Figure 7:
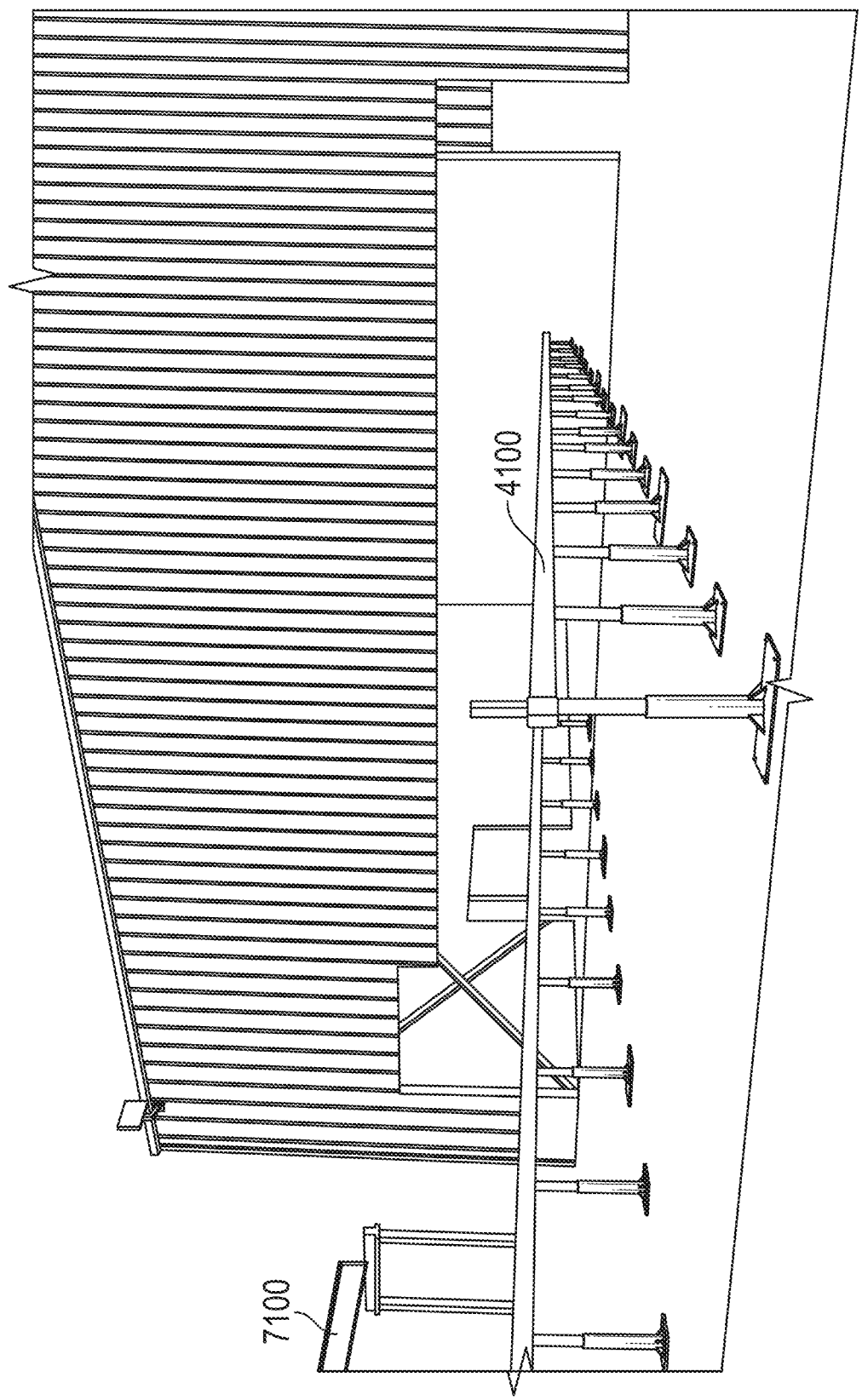
FIG. 7 is an outside view of an exemplary entry rack leading into and under the exemplary protective roofing.

FIG. 7 shows an exterior view of an exemplary loading rack 4100 and overhead crane 7100 located in an inland facility and for use in introducing tubular goods into a three-section conveyor.

Figure 14:
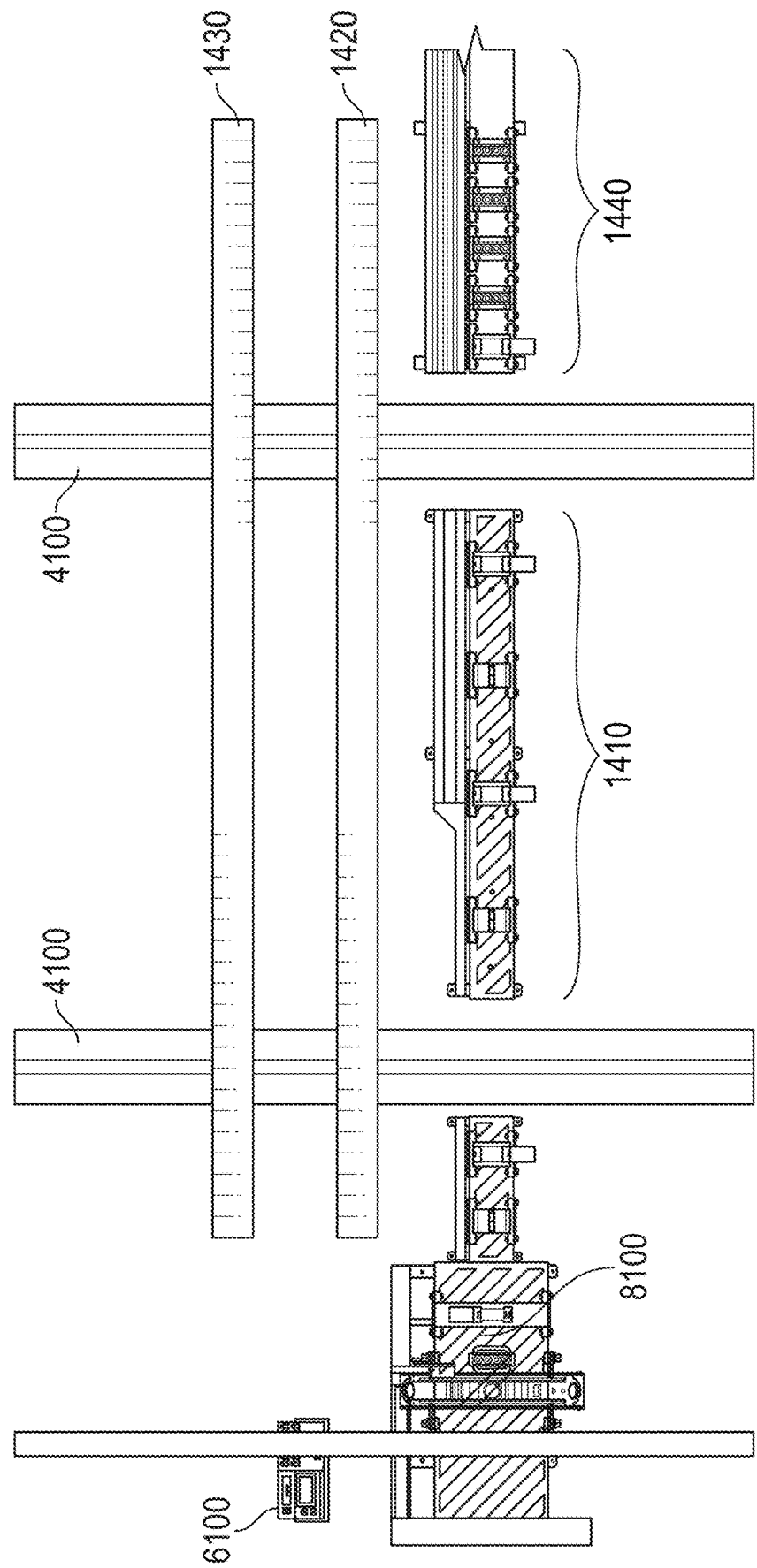
FIG. 14 is an overhead view of an exemplary entry rack, torque unit, first and third sections of the three-section conveyor, and two individual tubular goods, comprising of a first and second tubular good to make a tubular assembly.
Figure 15:
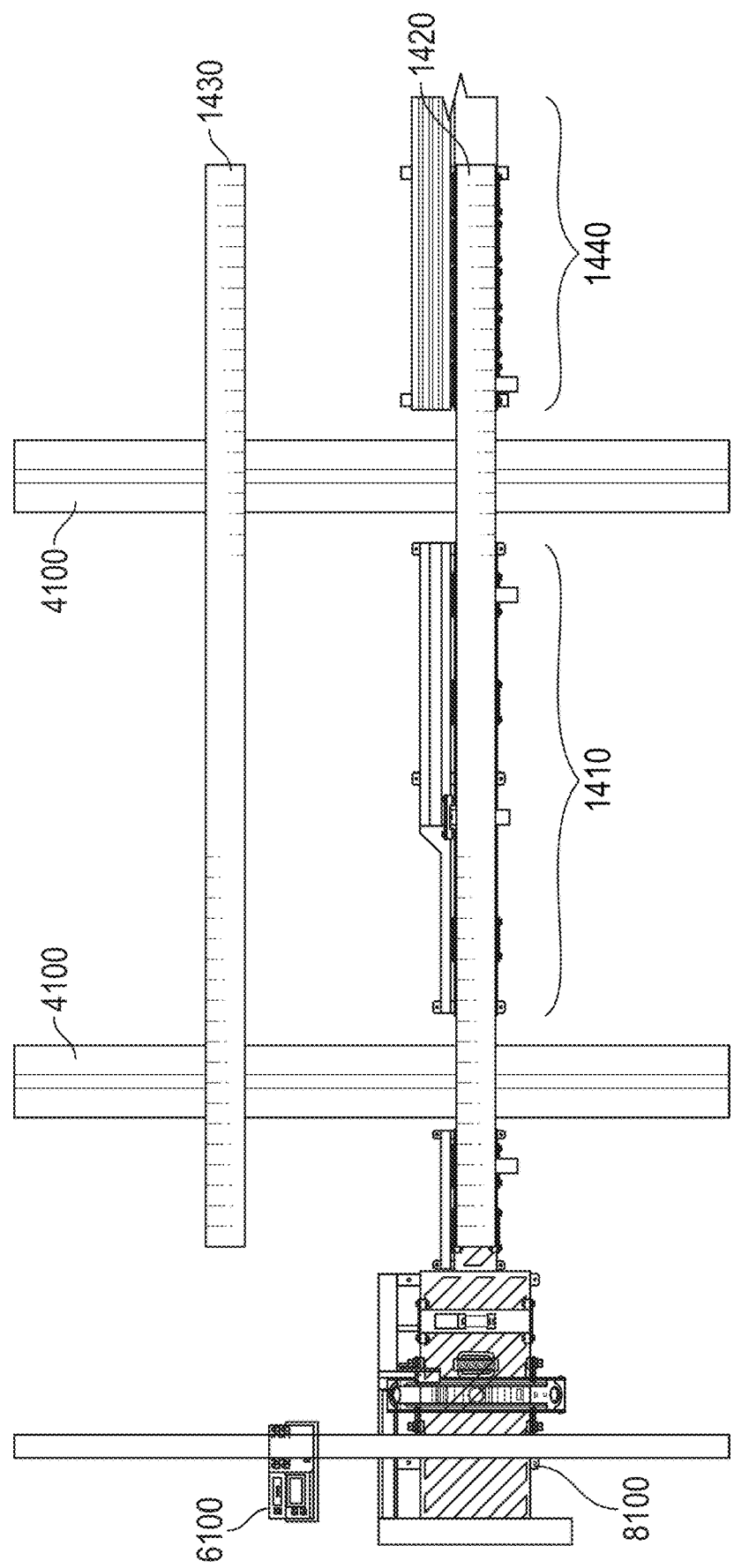
FIG. 15 is an overhead view of a first tubular good being loaded onto the first section of an exemplary three-section conveyor, whereas the second tubular good is waiting on the entry rack.

Arranging the Tubular Goods:

The tubular goods are arranged so that they can be joined together using a three-section conveyor 1710. As one example, FIGS. 14-17 show a first 1420 and second 1430 tubular good being introduced, via a loading rack 4100, to the first section 1410 of the three-section conveyor 1710 and then moved into position so that the tubular goods 1420, 1430 may be later torqued together. Specifically, FIG. 14 shows a preliminary step of the tubular arranging process wherein two tubular goods 1420, 1430 are resting on the introductory section of the loading rack 4200 before being introduced to the first section 1410 of the three-section conveyor 1710, where independent jacks 1100 will receive the tubular goods 1420, 1430 one by one. FIG. 15 shows a subsequent step of the tubular goods arranging process wherein the first tubular good 1420 has been introduced to the first section 1410 of the three-section conveyor 1710 and secured and stabilized by independent jacks 1100, while the second tubular good 1430 is resting on the introductory section of loading rack 4200, waiting for the first tubular good 1420 to be lead through torque unit 8100 and onto the second section 1610 of the three-part conveyor 1710.

Figure 16:
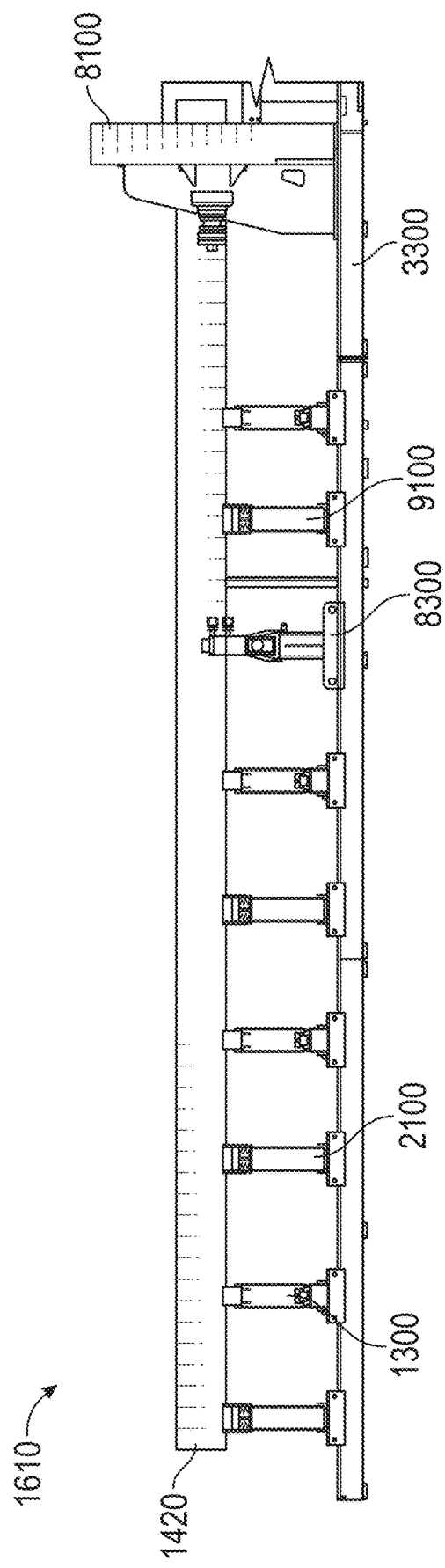
FIG. 16 is a side view of a first tubular good loaded and stabilized on the second section of an exemplary three-section conveyor, with an end of the first tubular good introduced into the torque unit.
Figure 17:
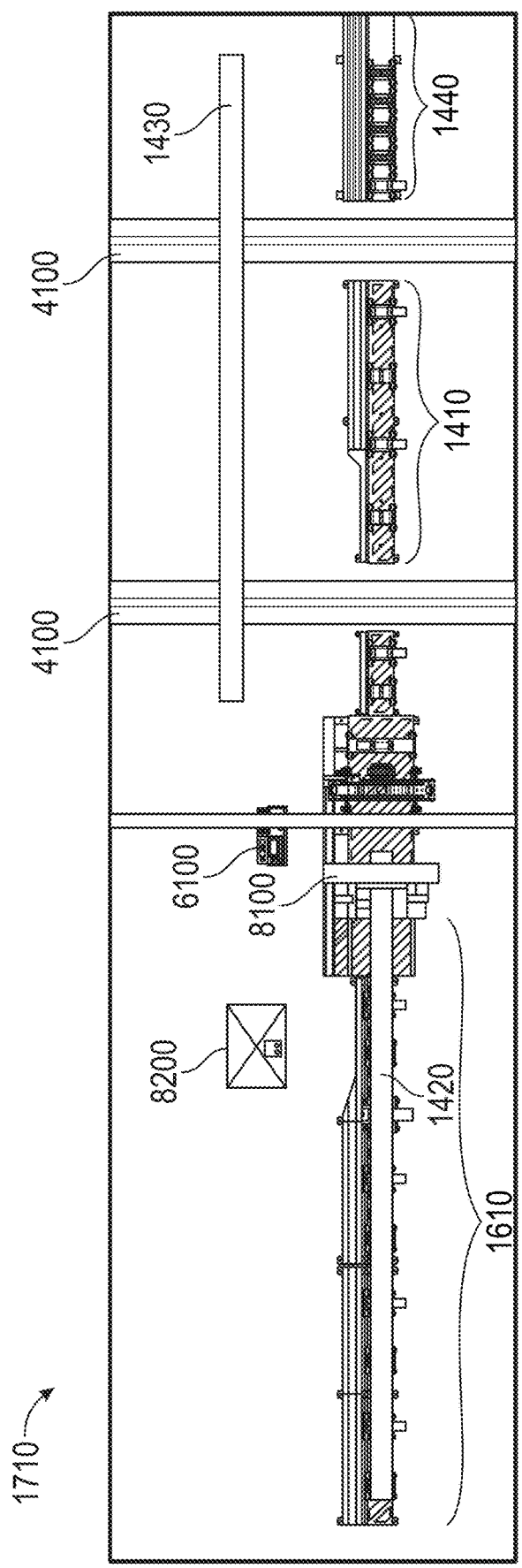
FIG. 17 is an overhead view of a first tubular good loaded and stabilized on the second section of an exemplary three-section conveyor, whereas the second tubular good is being loaded onto the first section of the three-section conveyor.

FIG. 16 shows a further step of an exemplary tubular arranging process wherein the first tubular good 1420 has been led through the torque unit 8100, and onto the second section 1610 of the three-part conveyor 1710. FIG. 17 shows another subsequent step of the exemplary tubular arranging process wherein the first tubular good 1420 is on the second section 1610 and a second tubular good 1430 is being introduced, via the loading rack 4100, to the first section 1410 of the three-part conveyor 1710.

While FIGS. 14-17 show an exemplary arranging process wherein each tubular good is introduced to the three-part conveyor 1710 via the first section 1410, in alternative embodiments the tubular goods 1420, 1430 may be introduced to other portions of the three-part conveyor 1710. For example, a first tubular good 1420 may be introduced directly onto the second section 1610 and/or a second tubular good 1430 may be introduced onto the second section 1610 and then moved to the first section 1410.

Figure 4:
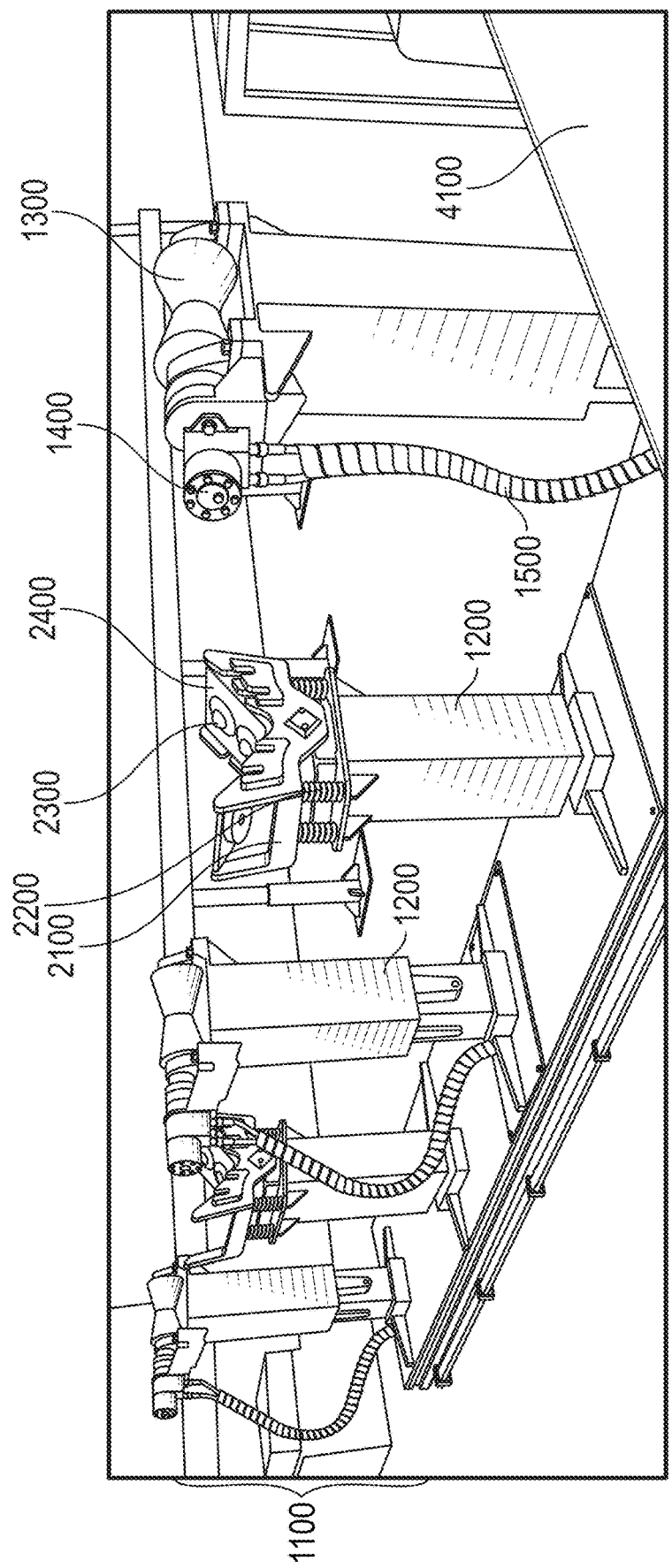
FIG. 4 is a side view of a first section of an exemplary three-section conveyor, including five independent jacks, three with conveyor roller attachments and two with steady rest omnidirectional roller attachments.

During the tubular good arranging process, the tubular goods 1420, 1430 are moved from one section of the three-section conveyor 1710 to another section of the three-section conveyor 1710 using a series of independent jacks 1100. The independent jacks 1100 can move horizontally along a conveyor track 3300, vertically to accommodate various shapes of tubular goods, and can move independently of other jacks 1100. FIG. 4 shows a side view of the first section 1410 of one example of a three-section conveyor 1710, with three independent jacks 1100 equipped with conveyor roller attachments 1300; and two independent jacks 1100 equipped with steady rest 2100 and omnidirectional roller attachments 2300, wherein all five total independent jacks 1100 shown are set into the floor of the facility for support and stability. As described further below, the conveyor roller attachments 1300 serve to propel a tubular good 1420, 1430 and the steady rest attachment 2100 with omnidirectional roller attachment 2300 serve to support a tubular good 1420, 1430 during the torquing process. Specifically, when tubular goods 1420, 1430 are being moved along the three-part conveyor 1710, the independent jacks 1100 with conveyor roller attachments 1300 are engaged (i.e. raised) so they are in contact with the applicable tubular good 1420, 1430 while the independent jacks 1100 with the steady rest 2100 and/or omnidirectional roller attachments 2300 are disengaged (i.e., lowered) so they are not in contact with the applicable tubular good 1420, 1430.

Figure 1:
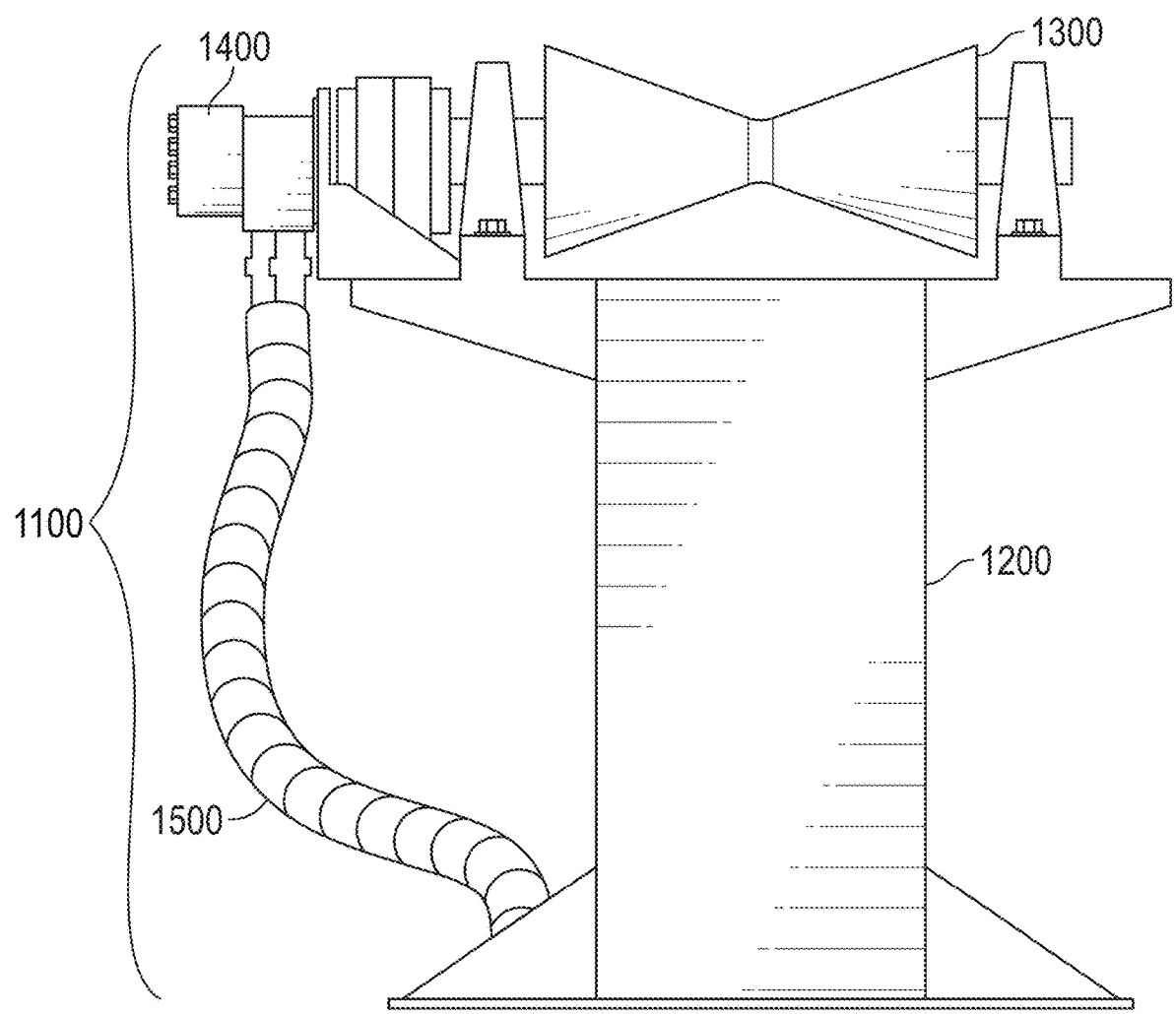
FIG. 1 is a side view of an exemplary independent jack with a conveyor roller attachment.

FIG. 1 shows a side view of an independent jack 1100 with a conveyor roller attachment 1300 supported by hydraulic column 1200. The conveyor roller attachment 1300 is powered by a conveyor roller motor 1400 connected to the axis of the roller attachment 1300. A hydraulic hose 1500 connects from conveyor roller motor 1400 to the electrical lines of three-section conveyor that leads to the conveyor control panel 6100. The roller attachment 1300 is hour glassed shaped with raised sides and a valley in the middle so that a tubular good 1420, 1430 is securely supported by the independent jack 1100. The conveyor roller attachment 1300 may take various shapes in other embodiments of the invention. For example, the conveyor roller attachment 1100 may be flat. As the conveyor roller attachment 1300, powered by the conveyor roller motor 1400, rotates, the tubular good 1420, 1430 moves along the length of the three-section conveyor 1710.

Figure 2:
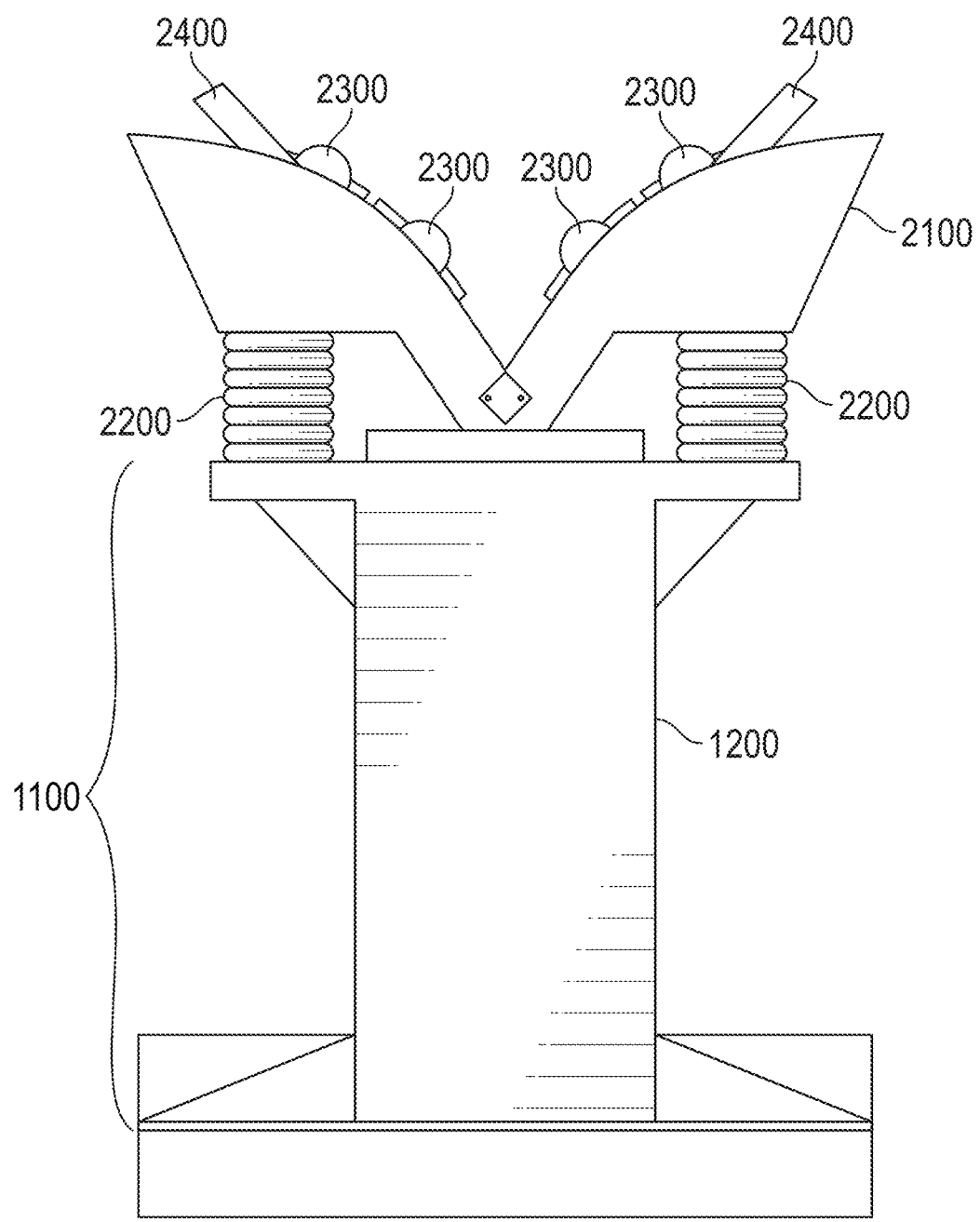
FIG. 2 is a side view of an exemplary independent jack with an omnidirectional roller attachment.

FIG. 2 shows a side view of an exemplary independent jack 1100 with steady rest attachment 2100 for supporting a tubular good 1420, 1430 during the torquing process. The steady rest attachment 2100 has an omnidirectional roller attachment 2300 with two rest plates 2400 forming a V-shape to allow tubular goods resting on the jack 1100 to allow limited movement during the torquing process. The independent jack 1100 with steady rest attachment 2100 also includes exposed support springs 2200 to stabilize the resting tubular good 1420, 1430. The support springs 2200, which advantageously allow the tubular goods to naturally move, may also be included on any other type of independent jack 1100, and not just independent jacks 1100 with steady rest attachments 2100.

Figure 5:
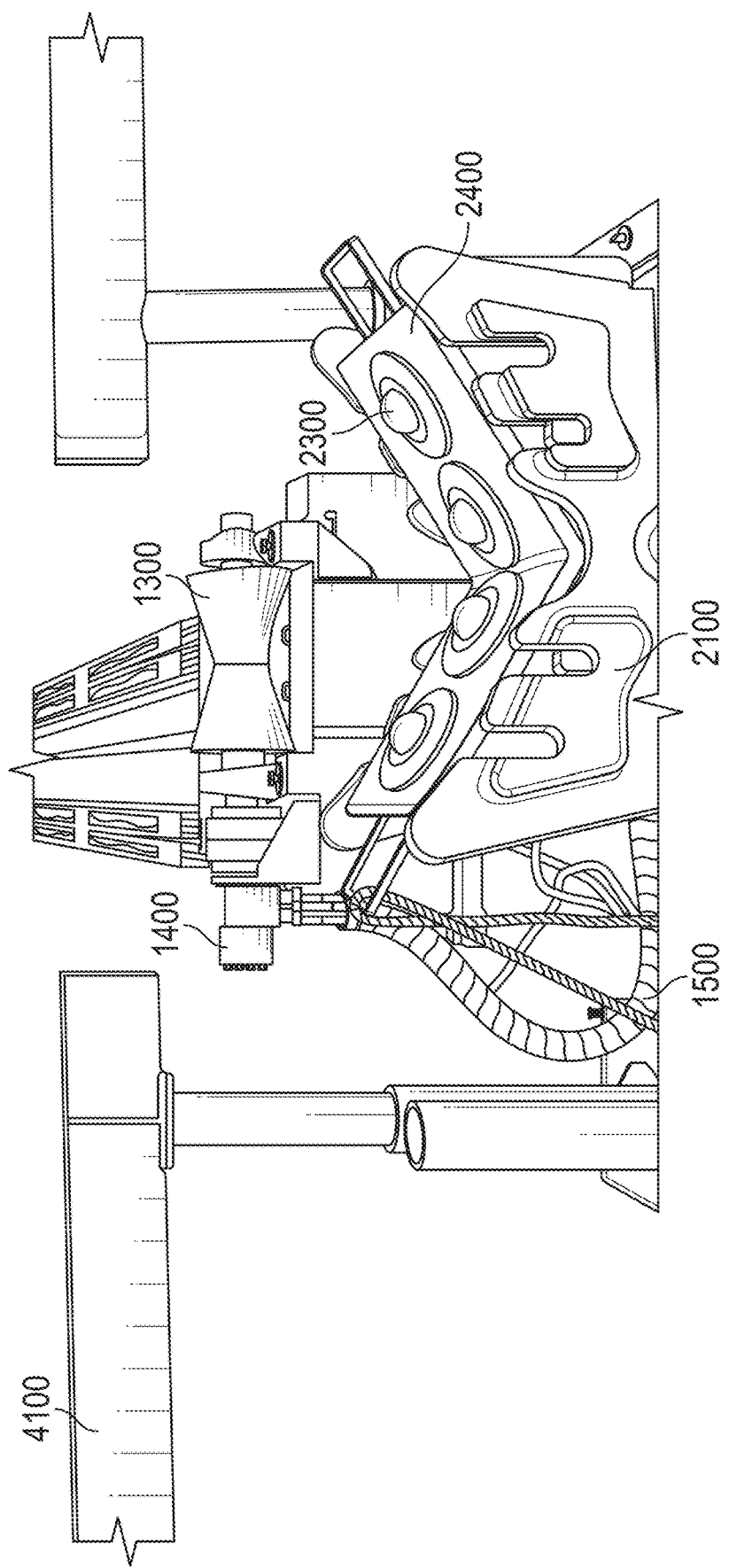
FIG. 5 is an overview of two exemplary independent jacks, one with a conveyor roller attachment and another with an omnidirectional roller attachment.
Figure 6:
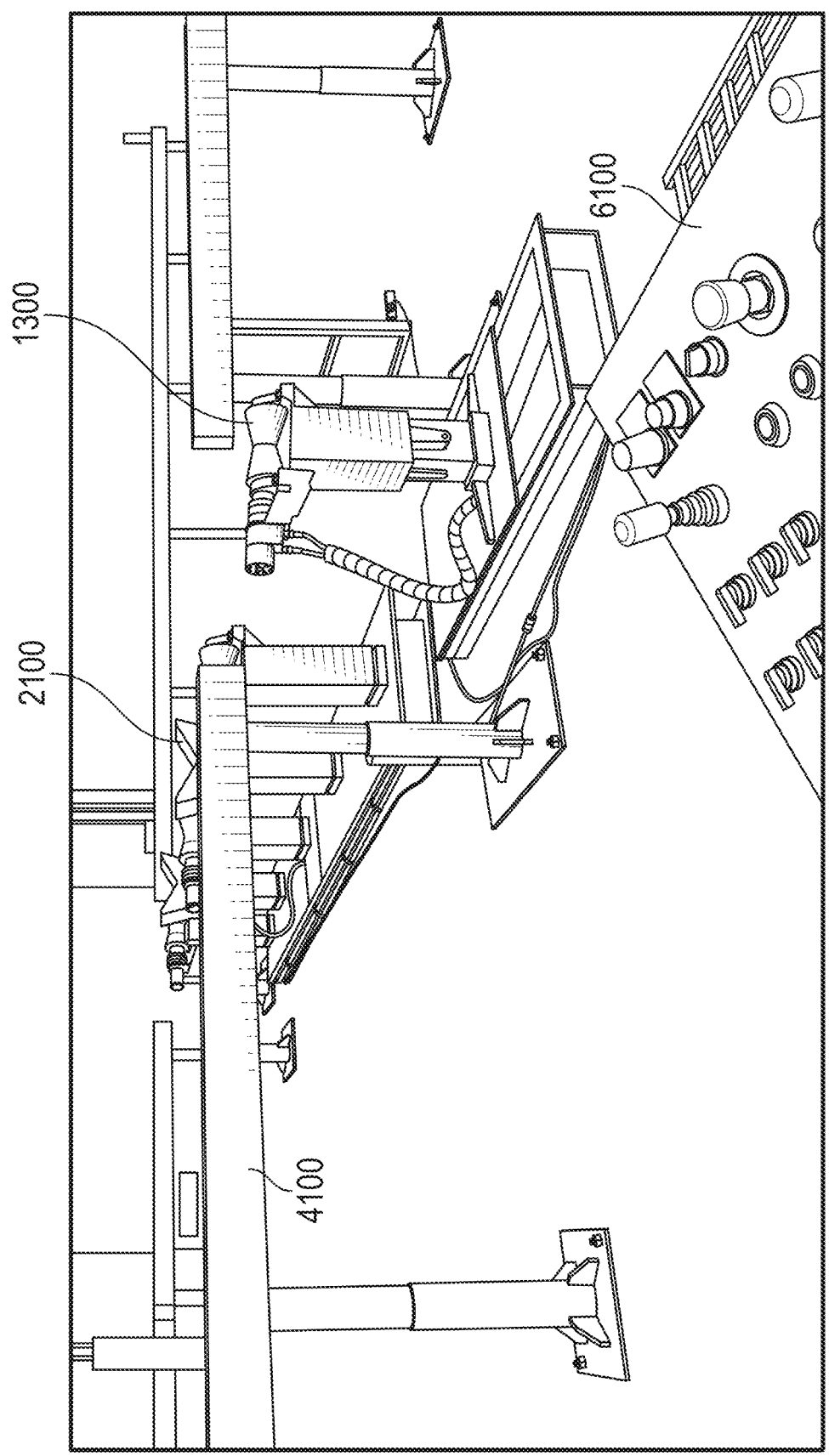
FIG. 6 is a perspective view of where the entry rack meets the first section of the exemplary three-section conveyor, from the perspective of the three-section conveyor's control panel.

FIGS. 5 and 6 show alternate views of the independent jacks 1100 of the first-section 1410 of the three-section conveyor 1710. Specifically, FIG. 5 shows an overhead view of two exemplary independent jacks 1100, one equipped with a conveyor roller attachment 1300 and the other independent jacks 1100 equipped with a steady rest 2100 and omnidirectional roller 2300 attachment 2100. FIG. 5 further shows the loading rack 4100 leading to the attachment heads 1300, 2300 of the independent jacks 1100. FIG. 6 shows another alternate view of the first section 1410 of an exemplary three-section conveyor 1710 from the perspective of a conveyor control panel 6100 and shows a wider view of the loading rack 4100 meeting on opposite sides of the first section 1410 of the three-section conveyor 1710.

Figure 3:
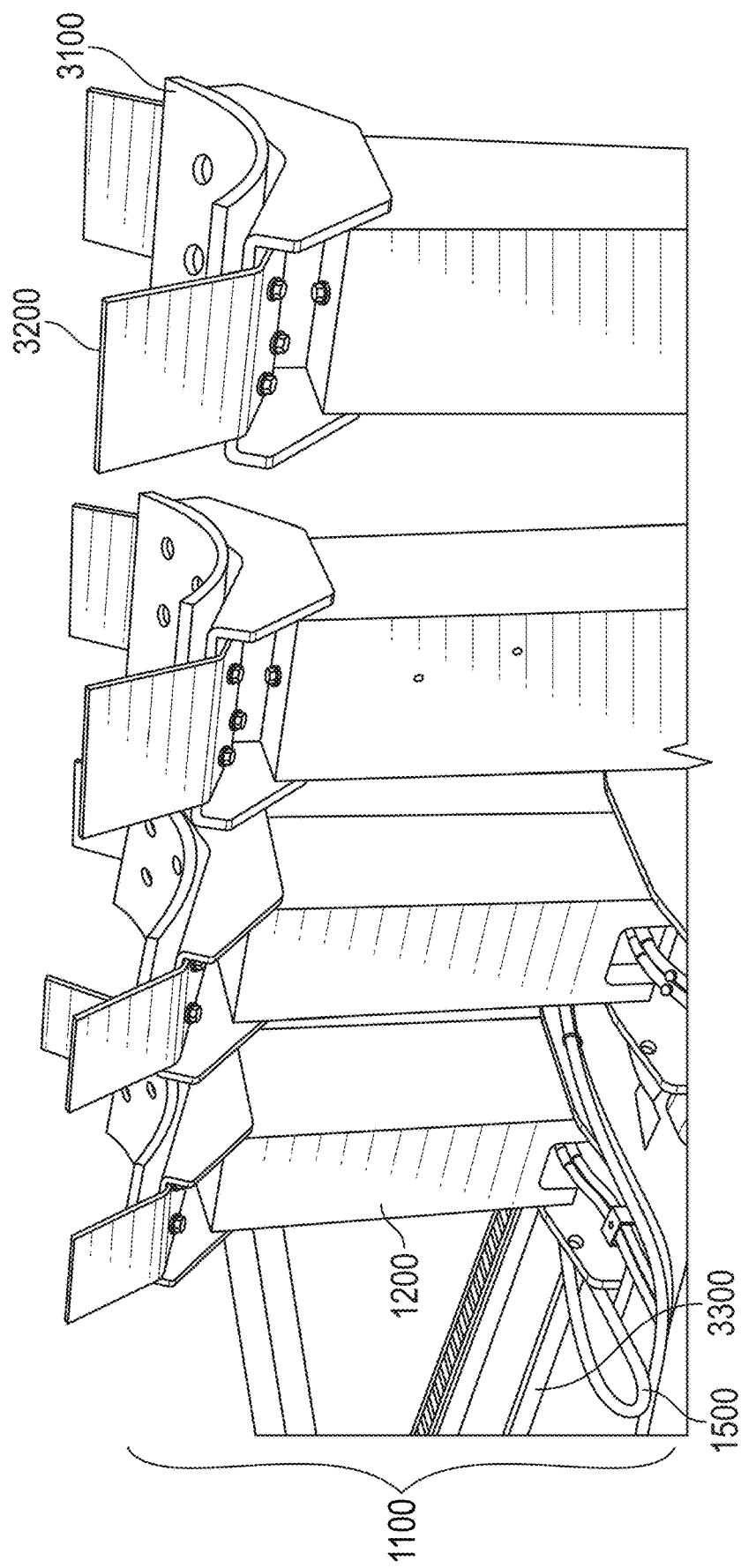
FIG. 3 is a side view of four exemplary independent jacks with side-harness attachments.
Figure 9:
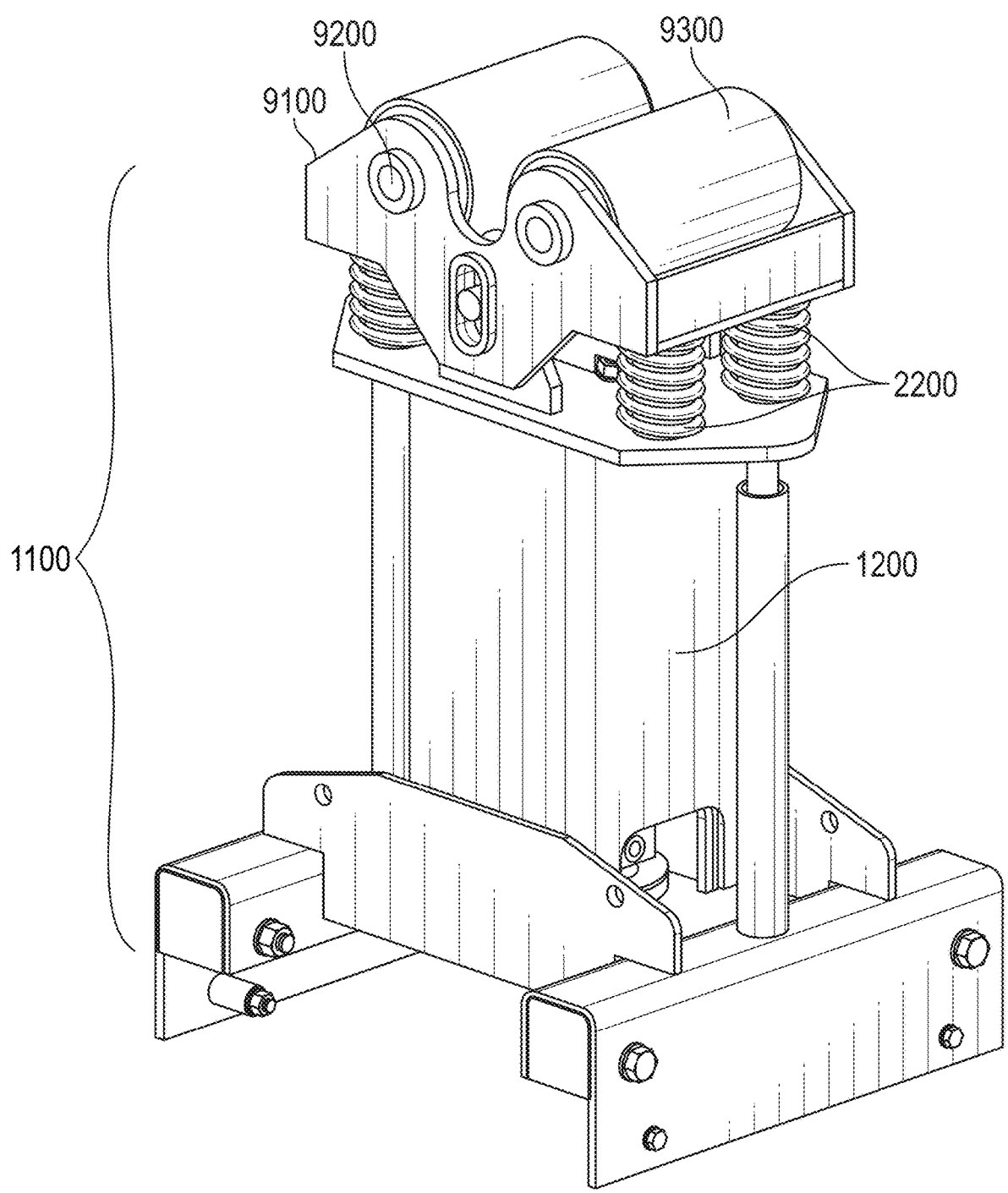
FIG. 9 is a side view of an exemplary independent jack with rotational rubber rollers and exposed support springs.

FIG. 3 discloses four exemplary independent jacks 1100 of the third section 1440 of the three-section conveyor 1710, each with a 0.5" rubber rest plate 3100 and two steel side-harness plates 3200, one on each side of the rubber rest plate 3100, extending out to prevent accidental roll off of the tubular assemblies. In this exemplary embodiment, the hydraulic hose 1500 connects from the base of the independent jacks 1100 to the to the electrical lines of three-section conveyor 1710 that lead to the conveyor control panel 6100. The independent jacks 1100 are attached and connected to conveyor track 3300. FIG. 9 shows an independent jack 1100 with steady rest attachment 2100 and a double roller attachment 9100 of the third section 1440 of the three-section conveyor 1710, consisting of two rubber rollers 9300 on two separate axles 9200, and exposed support springs 2200.

In one embodiment of the present invention, when the first section 1410 of the three-section conveyor 1710 receives the first tubular good 1420 of a set of two tubular goods, the hydraulic conveyor roller attachments 1300 move the first tubular good 1420 through the torque unit 8100 and onto the second section 1610 of the three-section conveyor 1710. The torque unit 8100 connects the first 1410 and second section 1610 of the three-section conveyor 1710 via an opening that allows tubular goods 1420 to move freely through the torque unit 8100 when it is not engaged. Also in this exemplary embodiment, the second section 1610 contains independent jacks 1100 with hydraulic conveyor rollers 1300, steady rests 2100 with a omnidirectional roller attachment 2300, and at least one independent jack 1100 with a steady rest attachment 2100 and a double roller attachment 9100.

In this exemplary embodiment, once the first tubular good 1420 of a set of two tubular goods is placed in and stabilized by the independent jacks 1100 of the second section 1610 of the three-section conveyor 1710, the second tubular good 1430 of a set of two tubular goods is placed onto, and stabilized by the engaged (i.e., raised) independent jacks 1100 with steady rest 2100 and omnidirectional roller 2300 attachments of the first section 1410. After both tubular goods of an intended tubular assembly 1320 are placed on opposite sides of the torque unit 8100 in the first 1410 and second 1610 sections of the three-section conveyor 1710, an independent jack 1100 with steady rest attachment 2100 and a double roller attachment 9100, consisting of two rotational rubber rollers 9300 on two separate axles 9200 may also engage with the tubular good on the second section 1610 to stabilize the tubular good during the torque process (described in further detail below).

Figure 18:
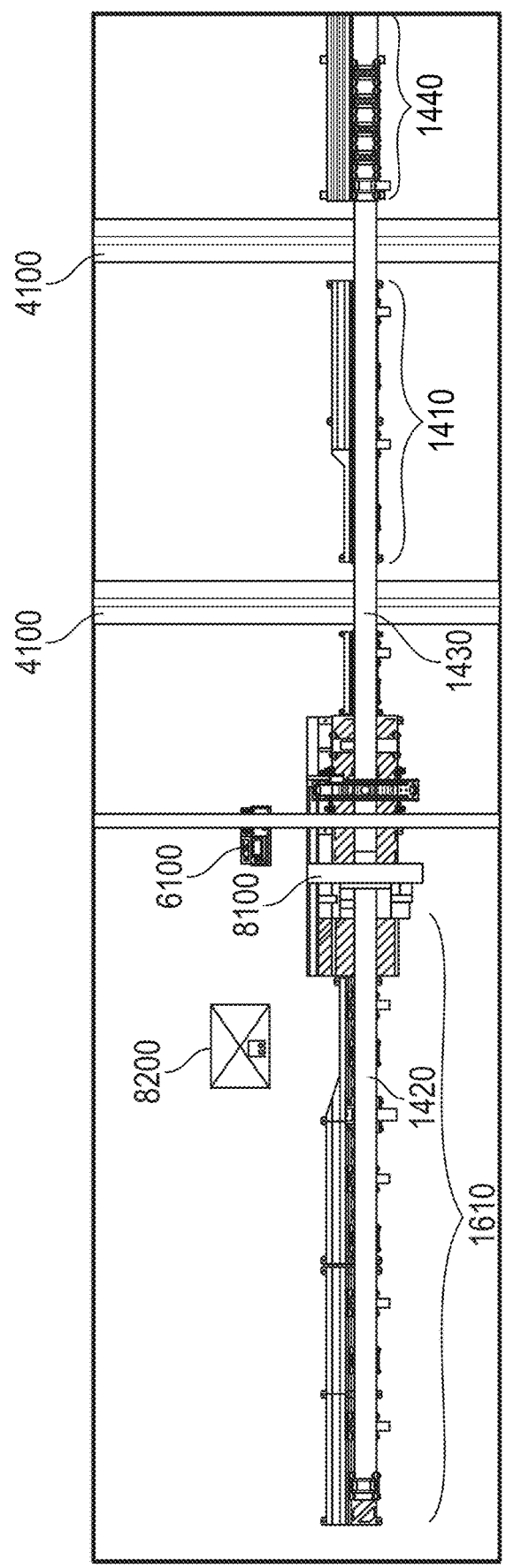
FIG. 18 is an overview of the second tubular good loaded and stabilized on the first section of an exemplary three-section conveyor while the first tubular good is loaded and stabilized on the second section of the three-section conveyor, whereas both first and second tubular goods are introduced into the torque unit to be threaded together and torqued to a tubular assembly.
Figure 19:
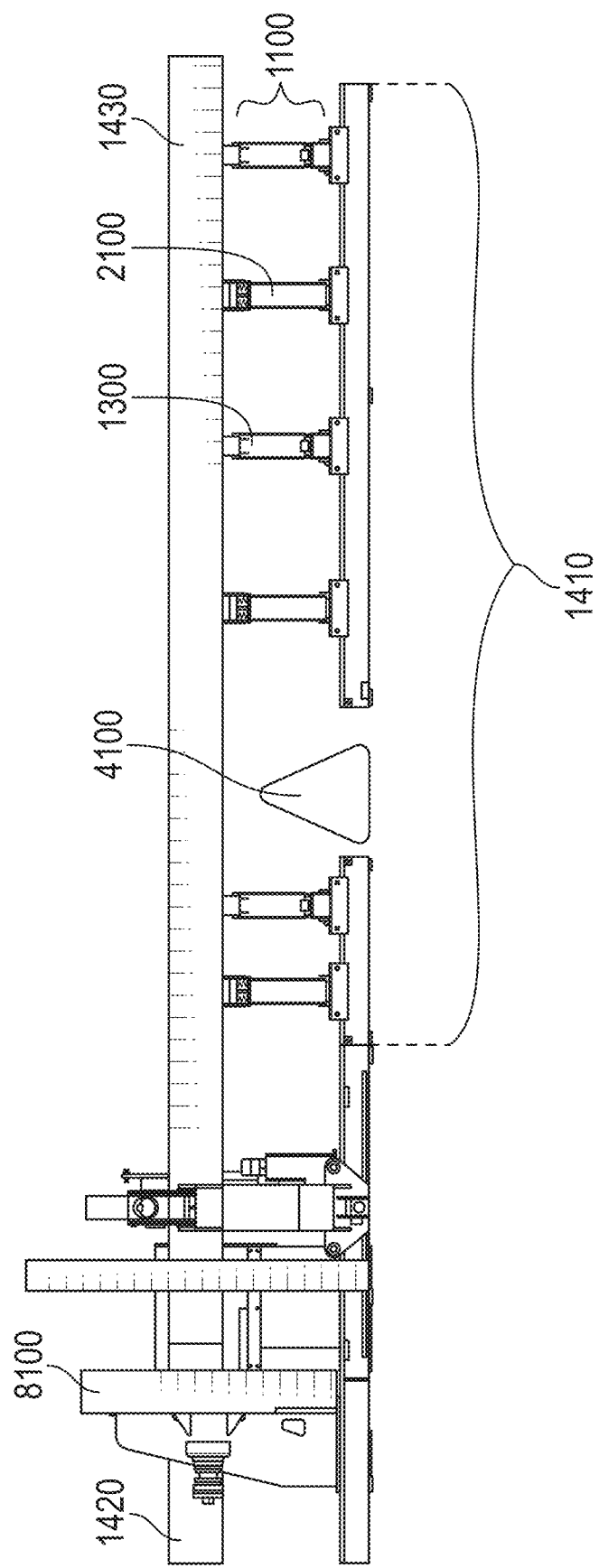
FIG. 19 is a side view of both first and second tubular goods are introduced into an exemplary torque unit to be threaded together and torqued to form a tubular assembly.
Figure 20:
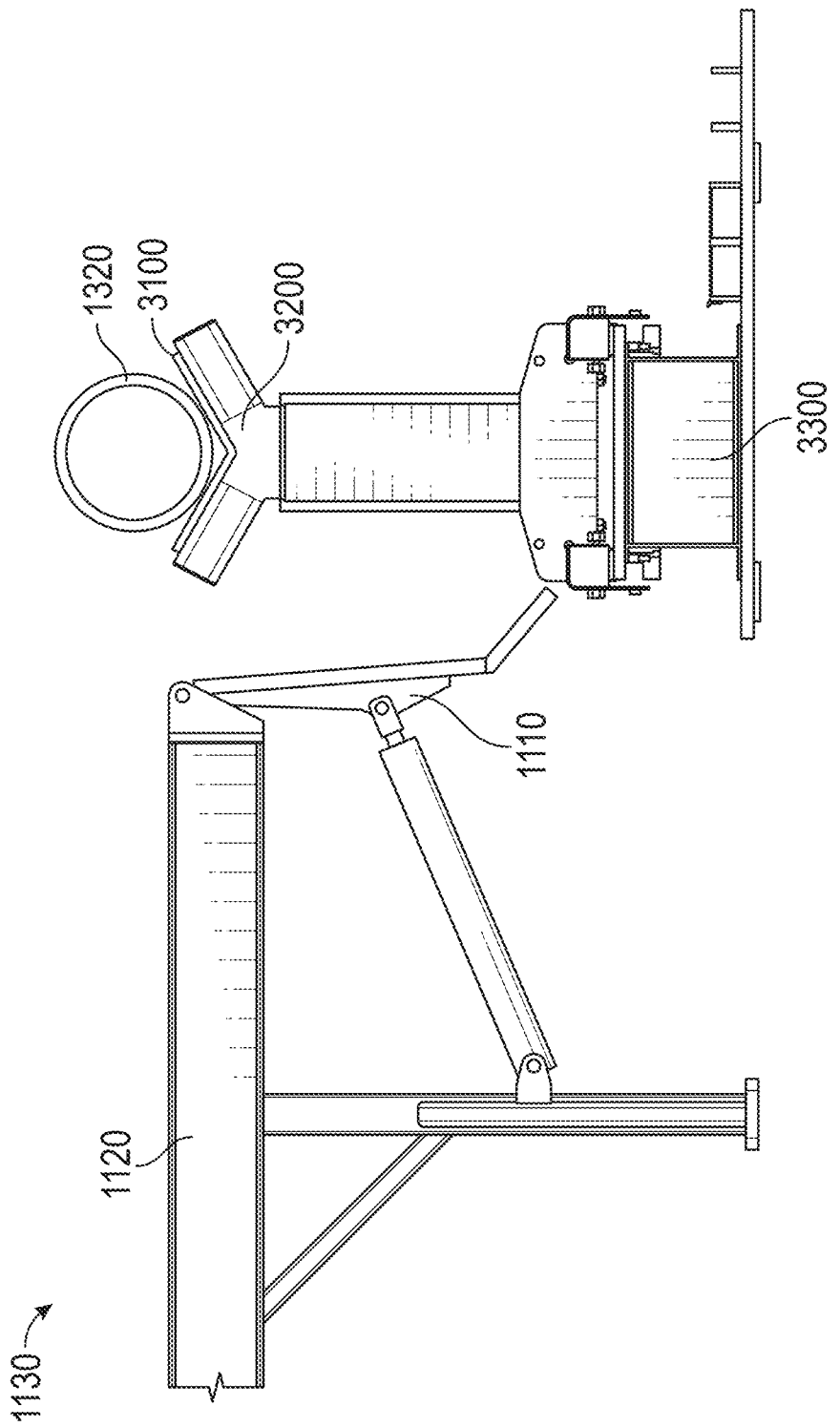
FIG. 20 is a perspective view from the conveyor line of a completed tubular positioned on the third section of an exemplary three-section conveyor near the racking system, with the hydraulic arms of the racking system in a lowered, resting position.
Figure 21:
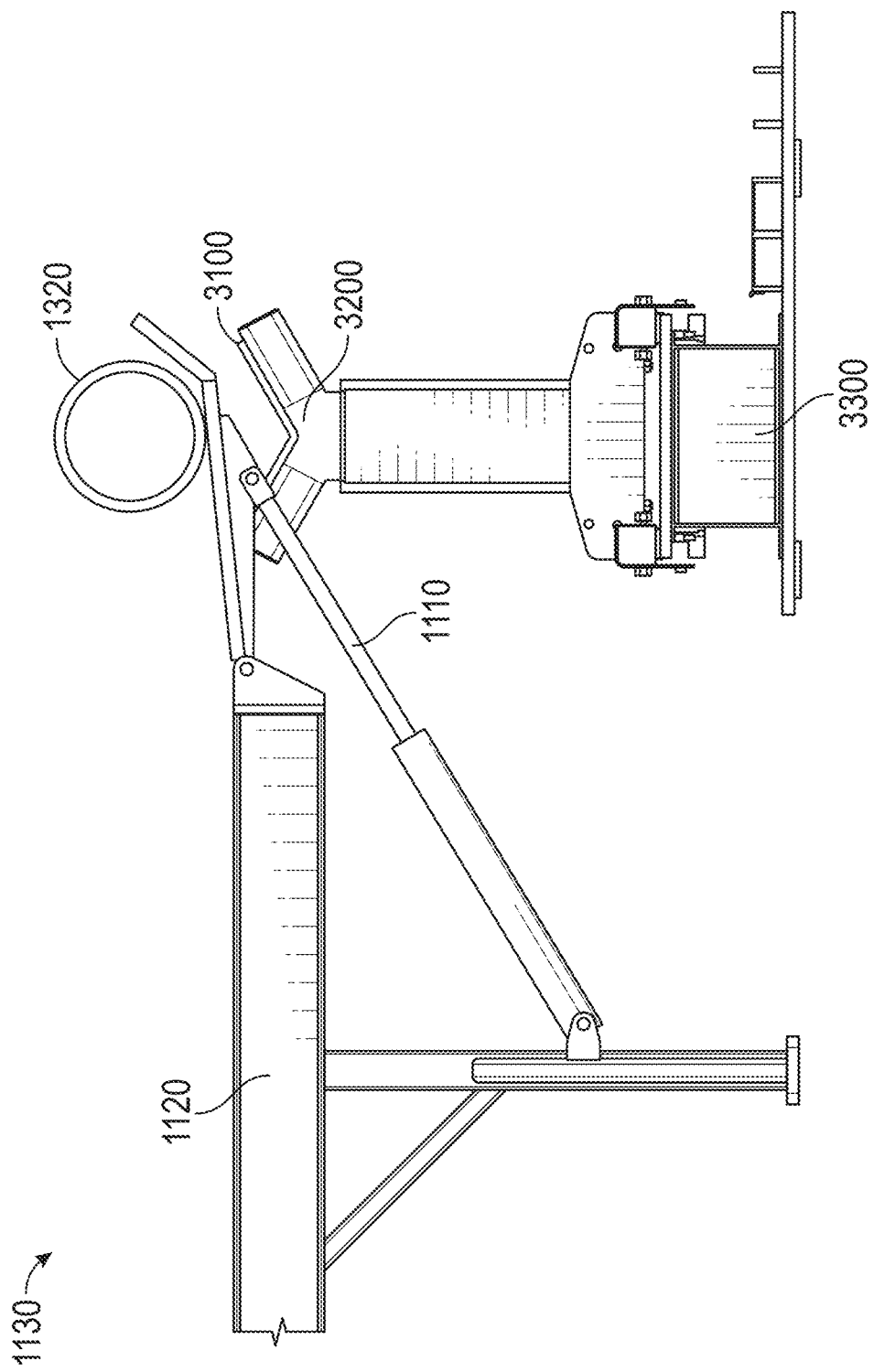
FIG. 21 is a perspective view from the conveyor line of a completed tubular positioned on the third section of an exemplary three-section conveyor near the racking system, with the hydraulic arms of the racking system in a raised position.

Torquing the Tubular Goods:

As shown in FIGS. 16, 18 and 19, in order to connect the tubular goods 1420, 1430 to each other, a spinner 8300 on the second section 1610 clamps and spins the first tubular good 1420 into the threads in the opening of the second tubular good 1430. The independent jacks 1100 with steady rests 2100 and rotational rubber rollers 9300 stabilize the two tubular goods 1420, 1430 to allow free rotational movement to help the spinner 8300 start the thread connection at a low torque, so as to connect and form a tubular assembly 1320 (wherein in this example, the tubular assembly 1320 is a tubular double).

Specifically, as a preliminary step in the torquing process, the conveyor rollers 1300 on both the first 1410 and second section 1610 guide each tubular good into the opening of the torque unit 8100 until the male and female ends of each tubular good make contact with one another. Thereafter, the independent jacks 1100 with conveyor rollers 1300 are lowered so that only the independent jacks with steady rest attachments 2100 are engaged with the tubular good to enable the tubular good to rotate while remaining stable, enabled by the omnidirectional roller attachment 2300 and two rotational rubber rollers 9300. FIG. 18 shows an overhead view of the first tubular good 1420 resting and stabilized on independent jacks 1100 of the second section 1610 of the three-section conveyor 1710. One end of the first tubular good and one end of the second tubular good 1430 are introduced into the torque unit 8100, such that the first tubular good 1420 and the second tubular good meet in torque unit 8100 with matching male and female ends that can be thread together. The spinner 8300 threads the male and female ends together to achieve a binding before torque unit 8100 will torque the two tubular goods to securely bind them and complete the tubular assembly 1320.

After the tubular goods 1420, 1430 are engaged together, via thread engagement, by the spinner 8300, the spinner 8300 is disengaged, and then the torque unit 8100 is engaged and completes the final torque to bind the tubular goods together for a complete and securely bound tubular assembly (e.g. a tubular double product) 1320. The torque unit 8100 consists also of a head stock 8101 and a tail stock 8102. The head stock 8101 provides a rotational function, rotating one tubular good into the counterpart tubular good; whereas the tailstock 8102 clamps the counterpart tubular good in a set position, restricting movement of the counterpart tubular good thereby allowing the tubular good that is rotated by the headstock 8101 to be spun into the threads of the counterpart tubular good to form a tubular assembly. After the tubular assembly 1320 is torqued and completed, the tubular assembly 1320 is moved out of the torque unit 8100 and along the first 1410 and second 1610 sections to reach the third section 1440 of the three-section conveyor 1710, wherein said third section 1440 is connected to the first section 1410 and then to the racking system 1130 located near the loading station for marine vessels (or any other transportation means known in the art).

Figure 8:
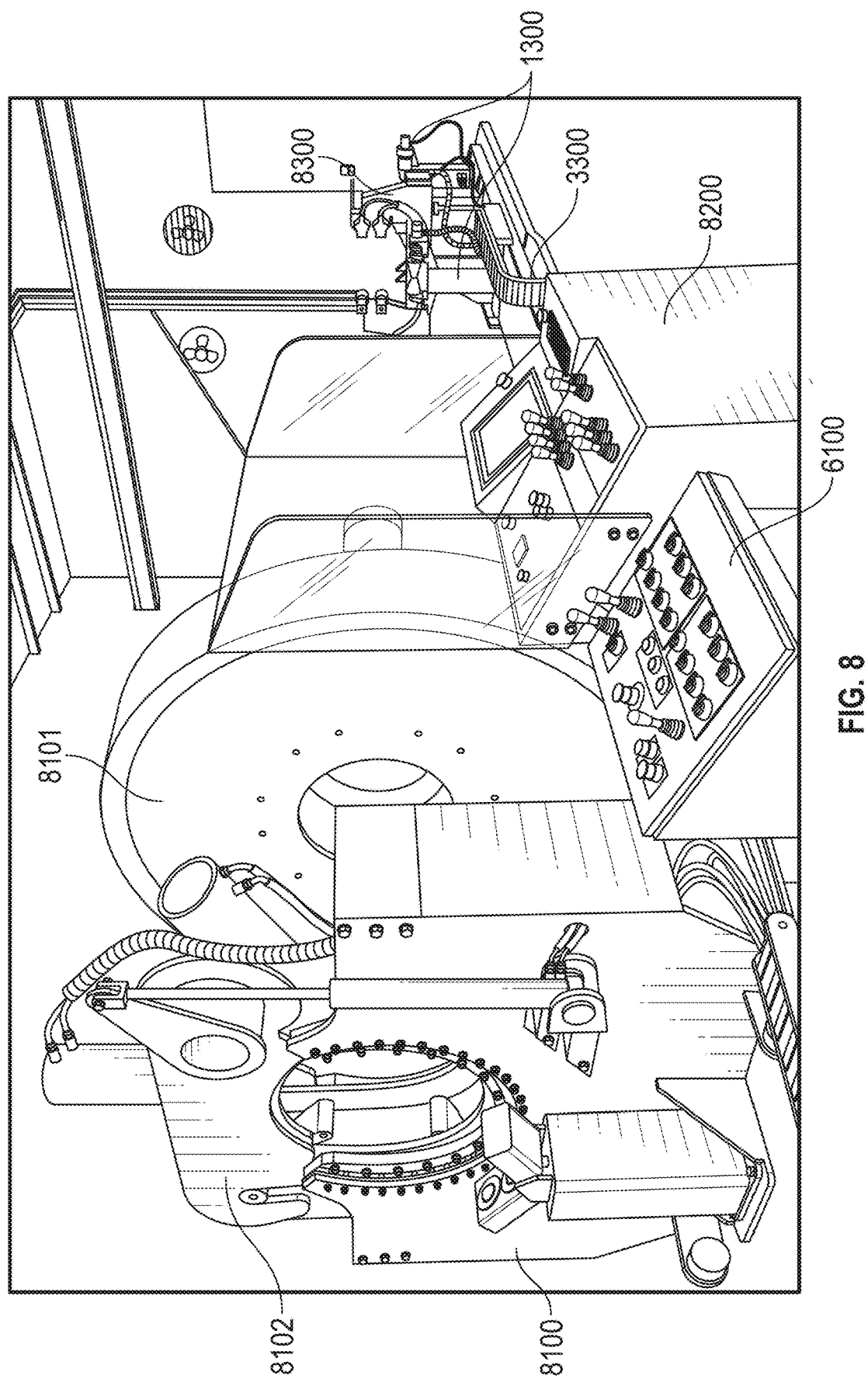
FIG. 8 shows a perspective view of an exemplary torque unit and second section of an exemplary three-section conveyor, from the perspective of the three-section conveyor's control panel.
Figure 10:
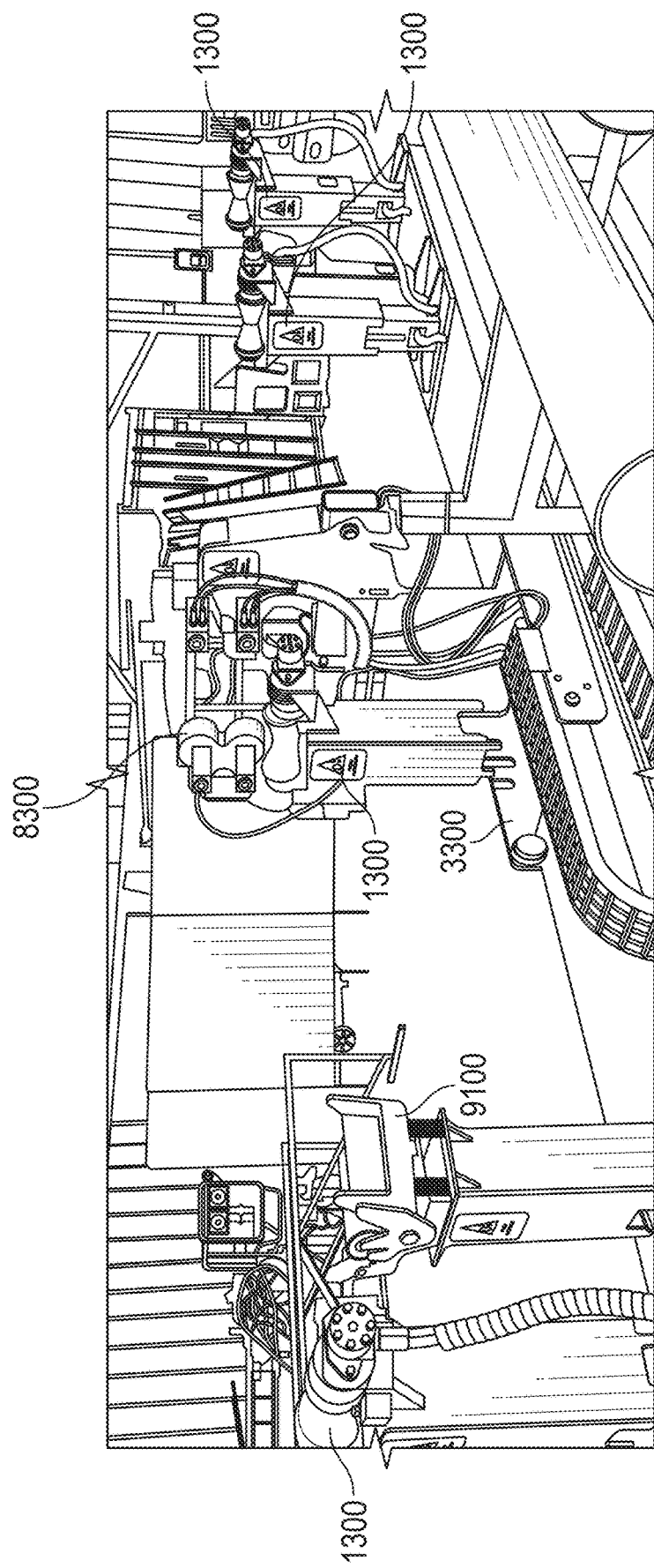
FIG. 10 is a side view of the second section of an exemplary three-section conveyor, including four of the eight independent jacks and an exemplary hydraulic spinner.
Figure 11:
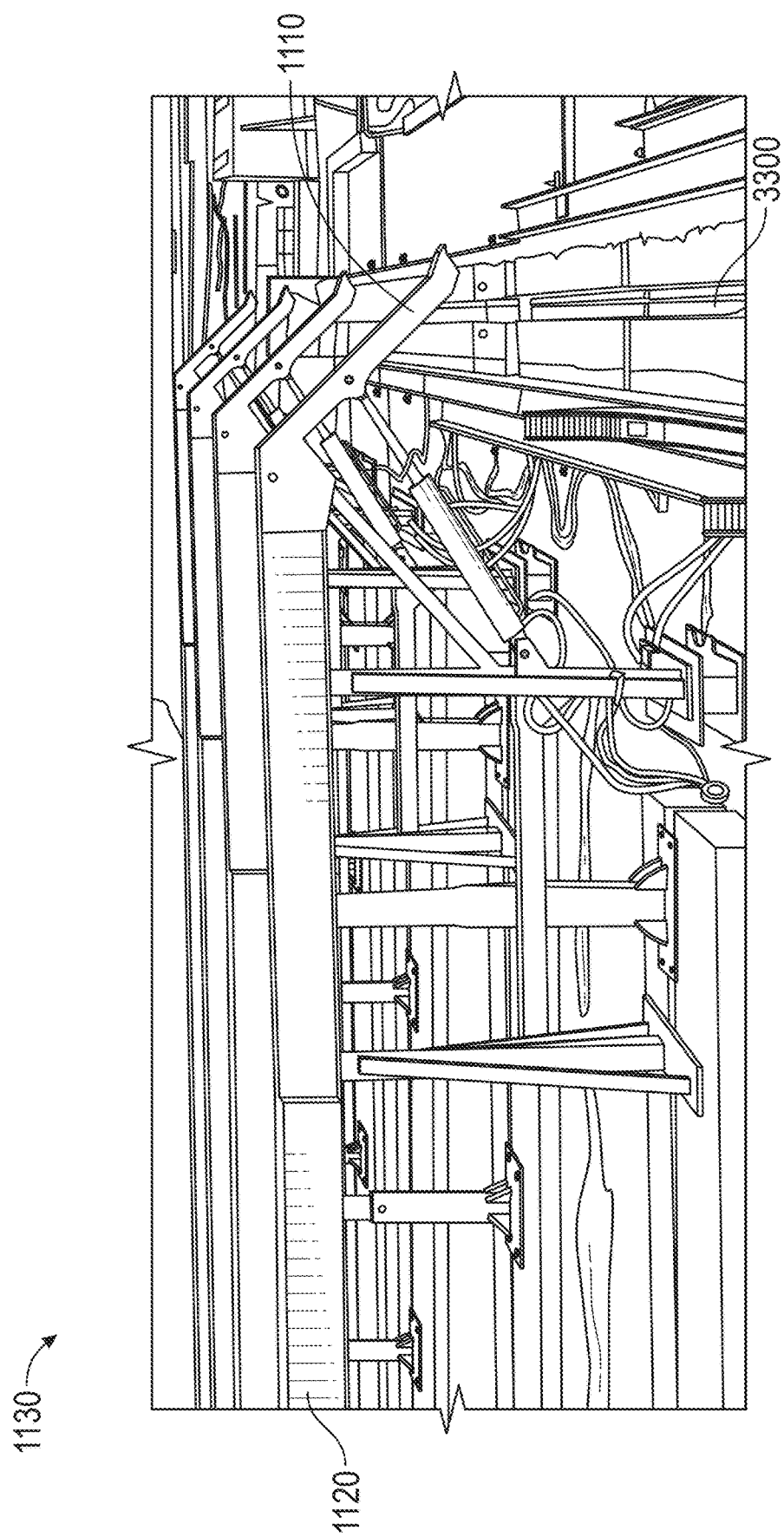
FIG. 11 is a perspective view of the third section of the three-section conveyor and racking system, with the hydraulic arms lowered.
Figure 12:
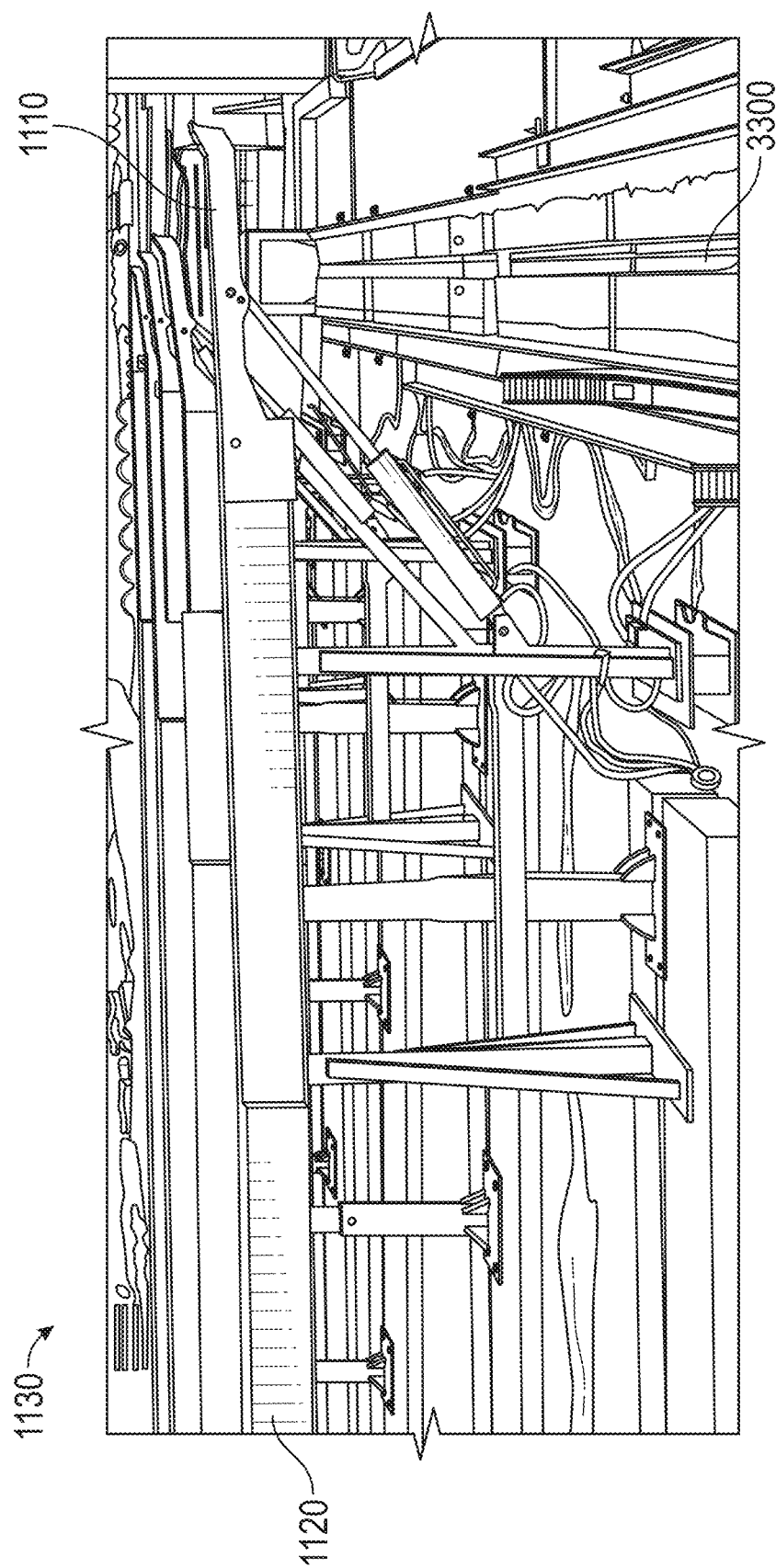
FIG. 12 is a perspective view of the third section of an exemplary three-section conveyor and racking system, with the hydraulic arms raised.

FIG. 8 shows an exemplary torque unit 8100 positioned in front of conveyor control panel 6100 and torque unit control panel 8200. FIG. 8 further shows the second section of the three-section conveyor 1710 with a spinner 8300 attached to the conveyor track 3300. The spinner 8300 attached to a conveyor track 3300 is also shown in FIG. 10 wherein two independent jacks 1100 with conveyor roller attachments 1300 are positioned to the rear of spinner 8300, and two independent jacks 1100 with conveyor roller attachments 1300 and one independent jack 1100 with steady rest attachment and double-roller attachment 9100 are positioned on the opposite side of the spinner 8300, the side facing torque unit 8100.

FIG. 19 discloses a side view of a completed tubular assembly 1320 resting in part on independent jacks 1100 of the first section 1410 of three-section conveyor 1710, with the torqued joint connection between the first tubular good 1420 and second tubular good 1430 resting in the torque unit 8100 while the rest of the tubular double assembly extends to the second section 1610.

Figure 22:
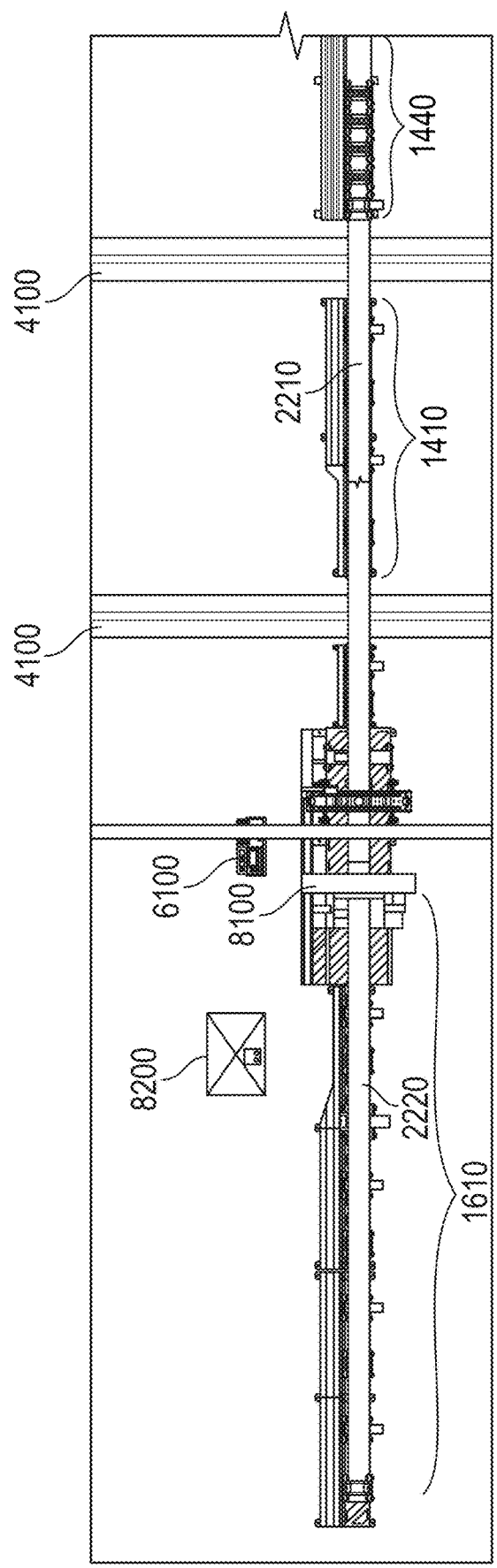
FIG. 22 is an overview of a completed tubular double assembly, intended to be two-thirds of a tubular triple assembly, loaded and stabilized on the first section of an exemplary three-section conveyor while a third tubular good is loaded and stabilized on the second section of the three-section conveyor, whereas both the third tubular good and the tubular double assembly are introduced into the torque unit to be threaded together and torqued to a complete tubular triple assembly.

Triple Tubular Goods and Other Configurations:

The present invention may also be used to create tubular assemblies comprising more than two tubular goods 1420, 1430. For example, as shown in FIG. 22, the present invention may be used to create tubular triples. When creating a tubular triple, a third tubular good 2220 is introduced into the first section 1410 from the loading rack 4100 after a two-thirds tubular double assembly 2210, meaning a tubular double assembly that constitutes two-thirds of the tubular triple assembly, has been torqued and completed and moved to the third section 1440. Then the third tubular good 2220 is moved through the torque unit 8100 and introduced to the second section 1610, where the tubular 2220 is similarly stabilized and staged by independent jacks 1100 with the steady rests 2100 and rotational rubber rollers 9300 while the independent jacks 1100 with conveyor roller attachments 1300 are lowered to allow for free rotational movement. The two-thirds tubular double assembly 2210 is moved from the third section 1440 to the first section 1410 by the conveyor track 3300 and reintroduced to the first section's 1410 conveyor rollers 1300. The first section's 1410 conveyor rollers 1300 then move the two-thirds tubular double assembly 2210 into the opening of the torque unit 8100 where it will make contact with the third tubular good 2220 so that the male and female ends of each tubular meet within the torque unit 8100. The spinner 8300 then starts the thread connection at a low torque, so as to connect and form a tubular triple by torquing an additional third tubular good 2220 onto the two-thirds tubular double assembly 2210. Thereafter, the torque unit 8100 is engaged and completes the final torque to bind the tubular goods together for a complete and securely bound tubular triple.

While the Figures depict the tubular goods 1420, 1430 as cylindrical tubulars, the tubular goods may alternatively comprise accessories such as, but not limited to, float collars, guide shoes, liner hangers or any other well construction accessory known in the art.

Racking & Storage of Completed Tubular Assemblies

After the tubular goods are joined to form a tubular assembly 1320, the independent jacks 1100 with conveyor roller attachments 1300 of the first 1410 and second sections 1610 raise and reengage with the completed tubular assembly 1320, and move the completed tubular assembly (e.g., but not limited to, a tubular double or tubular triple) 1320 along the first 1410 and second 1610 sections by conveyor rollers 1300 toward the third section 1440 of the three-section conveyor 1710, where the completed tubular assembly 1320 is introduced to independent jacks 1100 with rubber plating 3100 and protective side harnesses 3200, that then stabilize and carry the completed tubular assembly 1320 to the racking system 1130 at the end of the third section 1440.

In one example, and as shown in FIGS. 11, 12, 20 and 21, the third section 1440 of the three-section conveyor 1710 contains four independent jacks 1100 equipped with 0.5" rubber plating 3100 and steel side-harnesses 3200; whereas all four independent jacks 1100 move along the conveyor track 3300 to transport the completed tubular assembly 1320 to the racking system 1130; wherein said racking system 1130 consists of a product rack 1120 with four hydraulic arms 1110 on the end of the product rack 1120 facing the conveyor track 3300; wherein said hydraulic arms 1110 have a downward resting position to allow the independent jacks 1100 to move freely along the conveyor 3300. The hydraulic arms 1110, once engaged, lift up and reach fully across the third section 1440 conveyor 1710 and between the independent jacks 1100, so as to catch and lift the completed tubular assembly 1320 from the rubber plating 3100 on the independent jacks 1100 of the third section 1440 of the three-section conveyor 1710, causing the completed tubular assembly 1320 to roll back onto the racking system's 1130 product rack 1120 where the completed tubular assembly 1320 is temporarily stored.

Figure 13:
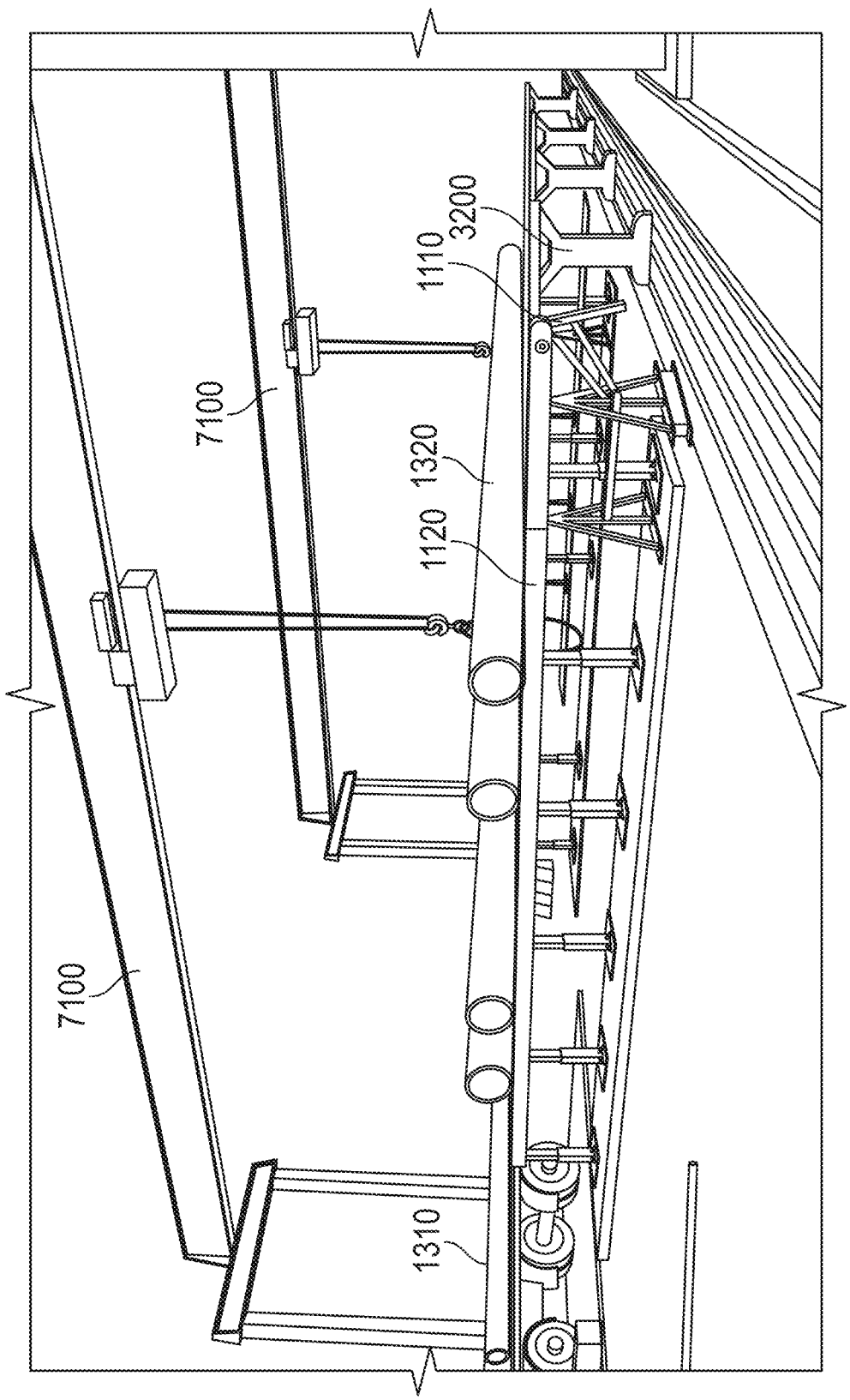
FIG. 13 is a side view of the third section of an exemplary three-section conveyor and racking system, with the hydraulic arms lowered and two overhead cranes engaged with a completed tubular.

Thereafter, as shown in FIG. 13, overhead cranes 7100 can load the completed tubular assemblies 1320 onto a trailer 1310 and moved from the product rack 1120 to loading stations for marine vessels, where completed tubular assemblies are loaded onto marine vessels (or any other transportation means) by an additional set of cranes; wherein said marine vessels (or other transportation means) can then take direct routes to well construction locations. Alternatively, the enhanced process may use other machinery known in the art to torque and move the tubular assemblies to the transportation means.

What is claimed is:

1. An improved process for joining tubular goods to create a tubular assembly comprising:
   positioning a first tubular good onto a section of a three-section conveyor;
   positioning a second tubular good onto an another section of said three-section conveyor;
   moving said first and second tubulars together so said first and second tubulars meet within a torque unit located between the two sections of said three-section conveyor;
   engaging said torque unit to torque said first tubular to said second tubular to form a tubular assembly; and
   wherein said joining process occurs at an inland facility.

2. The improved process of claim 1 wherein said first and second tubulars are moved by at least one independent jack comprising a conveyor roller attachment.

3. The improved process of claim 1 further comprising moving said tubular assembly to a third section of said three-section conveyor.

4. The improved process of claim 3 further comprising moving said tubular assembly from said third section to a racking system using a hydraulic arm.

5. An improved system for joining tubular goods to create a tubular assembly comprising:
   a loading rack;
   a three-part conveyor comprising
   a first section adjacent to said loading rack and having a proximal and a distal end,
   a second section located adjacent to said proximal end of said first section, and
   a third section located adjacent to said distal end of said first section;
   a torque unit located between said first section and said second section;
   a spinner located within said second section; and
   a racking system proximately located to said third section, wherein said improved system is located at an inland facility.

6. The improved system of claim 5 wherein said first section further comprises:
   at least one independent jack comprising a conveyor roller attachment; and
   at least one independent jack comprising a steady rest attachment.

7. The improved system of claim 6 wherein said independent jack with said steady rest attachment further comprises omni directional rollers and support springs.

8. The improved system of claim 5 wherein said second section further comprises:
   at least one independent jack comprising a conveyor roller attachment; and
   at least one independent jack comprising a steady rest attachment.

9. The improved system of claim 5 wherein said third section further comprises:
   at least one independent jack comprising a conveyor roller attachment; and
   at least one independent jack comprising a steady rest attachment.

10. The improved system of claim 9 wherein said independent jack with said steady rest attachment further comprises omni directional rollers and support springs.

* * * * *